United States Patent

[11] 3,589,306

| [72] | Inventor | Raymond Logan<br>Grand Rapids, Mich. |
|---|---|---|
| [21] | Appl. No. | 826,155 |
| [22] | Filed | May 20, 1969 |
| [45] | Patented | June 29, 1971 |
| [73] | Assignee | Werner Lehara, Inc.<br>Grand Rapids, Mich. |

[54] INTERMITTENT BELT DRIVE FOR DOUGH DEPOSITING MACHINE
7 Claims, 7 Drawing Figs.

[52] U.S. Cl. .................................................. 107/27
[51] Int. Cl. .................................................. A21c 11/16
[50] Field of Search ....................................... 107/27-
 —29, 1, 54; 118/13, 14, 16

[56] References Cited
UNITED STATES PATENTS
1,903,570 4/1933 Kremmling .................. 107/27

2,217,020 10/1940 Jurgens et al. ............... 107/27 X
*Primary Examiner*—Louis K. Rimrodt
*Attorney*—Price, Heneveld, Huizenga and Cooper

ABSTRACT: This disclosure relates to depositing of flowable materials such as cookie dough, jams, and the like, the depositing being carried out by forcing the flowable material out through an effluent port of a hopper onto a continuous belt which is moved intermittently between each depositing cycle. The belt is intermittently moved by a drive wheel, which continuously drives a portion of the belt, remote from the depositing hopper, and a pair of reciprocating rollers which move with the drive wheel during a first time interval to take up the slack generated by the drive wheel, and to move against the drive wheel movement at a second time interval to move the belt beneath the depositing hopper.

INVENTOR.
RAYMOND LOGAN
BY
ATTORNEYS

PATENTED JUN29 1971

INVENTOR.
RAYMOND LOGAN
BY
ATTORNEYS

INTERMITTENT BELT DRIVE FOR DOUGH DEPOSITING MACHINE

This invention relates to dough depositing. In one of its aspects, the invention relates to a dough depositing machine in which a flowable material is deposited onto a continuous belt which is moved intermittently between depositing cycles by a continuously driven wheel which engages a portion of the belt, and reciprocating belt engaging means which move in one direction with the wheel to take up slack generated thereby, and in a second direction against the movement of the wheel to move the entire belt.

In the extrusion of candy, batter, cookie dough, and the like, the extruded material is frequently deposited intermittently from a stationary extruder onto an intermittently moving belt, the belt moving between depositing cycles. For this purpose, clutch operated devices have been used to drive the belt. Many other devices such as dog wheels have been used for intermittently driving a belt.

I have now discovered a means for intermittently driving a belt for the depositing of cookie dough, jams, candies and the like in which the belt is driven by a continuously driven wheel and two idler rollers which reciprocate to move the belt beneath the hopper during a first time interval, and to take up slack generated by the wheel during a second interval of time.

By various aspects of this invention one or more of the following, or other, objects can be obtained.

It is an object of this invention to provide a belt drive mechanism for intermittently driving a belt beneath a depositing machine wherein portions of the belt are continuously driven.

It is an object of this invention to provide an intermittent belt drive which can be easily converted to a continuous belt drive for dough depositing machines and the like.

It is a still further object of this invention to provide a dough depositing machine having a simplified means for intermittently moving a continuous belt on which the dough is deposited.

Other aspects, objects, and the several advantages of this invention are apparent to one skilled in the art from a study of this disclosure, the drawings, and the appended claims.

Accordingly to the invention, there is provided an apparatus for depositing cookies and the like onto a continuous belt wherein means are provided above the belt for depositing dough in predetermined amounts onto the belts. The continuous belt has means for intermittently moving the belt including means supporting the belt so as to form a loop, means retarding the movement of the belt around the loop, and means continuously driving a portion of the belt. Reciprocating belt engaging means are provided adjacent the continuous driving means for moving with the continuous driving means during a first time interval to take up slack generated thereby and to move in a direction different than the continuous driving means during a second time interval to move the belt around the loop during the second time interval.

The invention will now be described with reference to the accompanying drawings in which.

Figure 1:
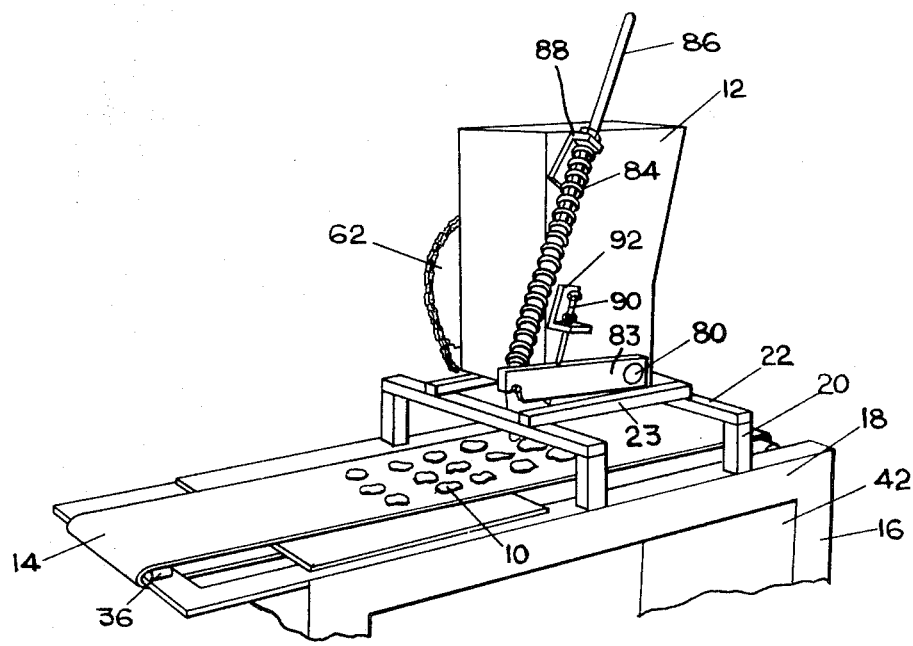
FIG. 1 is a perspective view of the dough or jam depositing machine.
Figure 2:
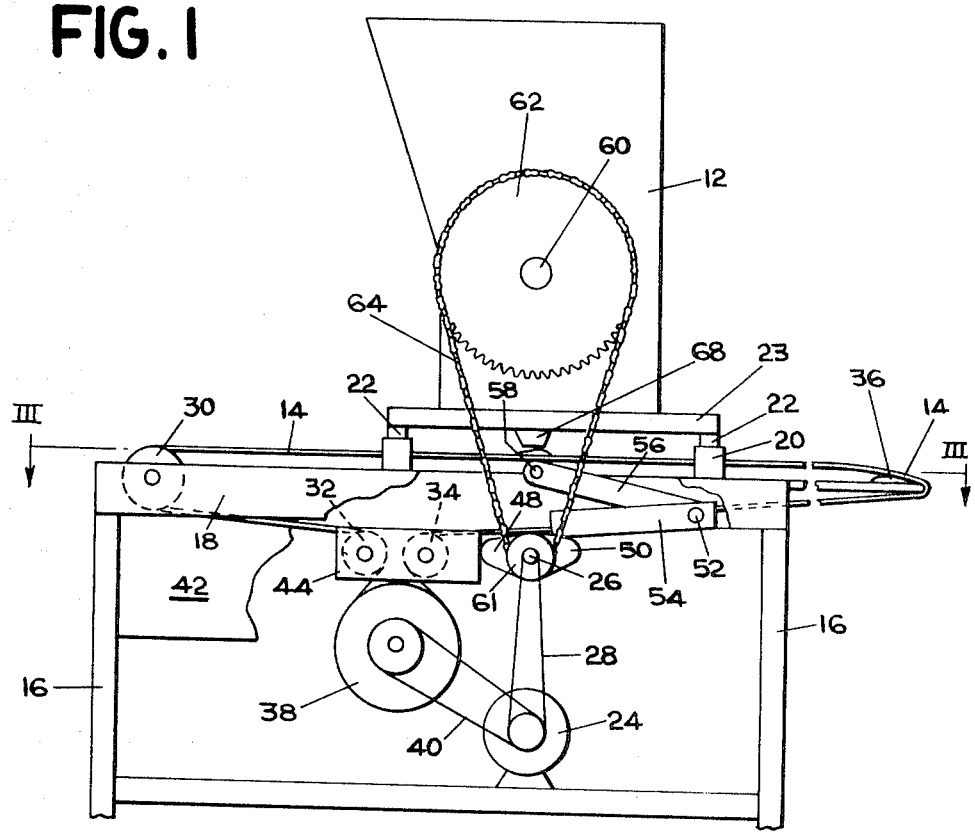
FIG. 2 is a side elevational view, partly in section, of the machine illustrated in FIG. 1, the view being taken from the opposite side than that seen in FIG. 1.

Referring now to the drawings, cookie dough 10 is deposited on a conveyor belt 14 from a hopper 12. The hopper is supported by base uprights 16 and base horizontal supports 18. The hopper is supported on the base by post 20 and crossmembers 22 and 23.

Figure 3:
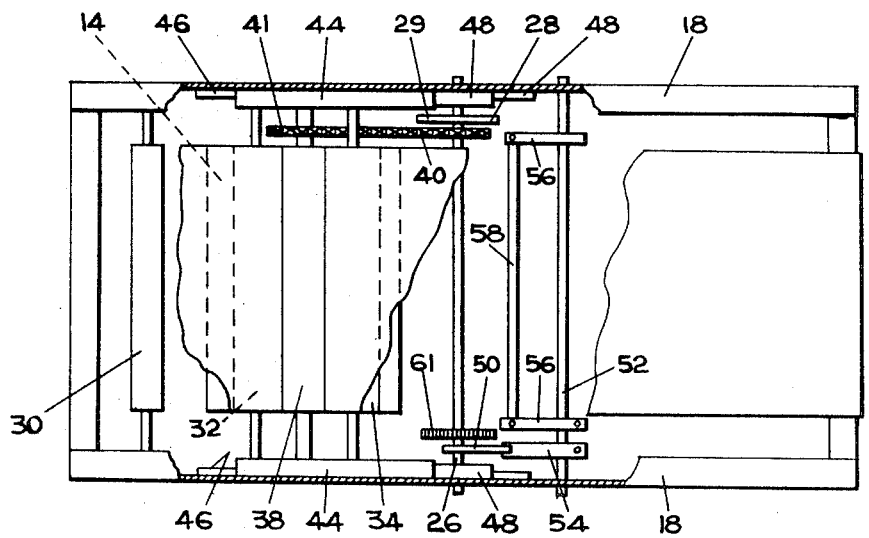
FIG. 3 is a plan view taken along lines III–III of FIG. 2.

A motor 24 is mounted on the base and drives the cam shaft 26 through a chain 28 and sprocket 29 on the cam shaft 26. The belt 14 engages idler rollers 30, 32 and 34, bar 36, and drive roller 38. The motor drives the drive roller 38 through a chain 40 and a sprocket 41 (FIG. 3). The cam shaft 26 and the drive roller 38 are supported at either side of the machine by side plates 42.

The idler rollers 32 and 34 are journaled in slide bars 44 which are adapted to reciprocate horizontally in tracks 46 at either side of the supporting base. The slide bars are driven by an eccentric cam 48 which is fixed on the cam shaft 26.

A shaft 52 is journaled in the base horizontal supports 18 at either side of the base. A follower bar 54 is fixed on the shaft 52 and contacts an eccentric cam 50 which is mounted for rotational movement on the cam shaft 26. Arms 56 are fixed to the shaft 52 at one end and are connected by a crossarm 58 at the other end. The crossarm 58 is positioned beneath depositing cups 68 and beneath the top layer of belt 14.

A drive shaft 60 extends through the hopper 12. The drive shaft 60 has fixed thereto a sprocket 62 which is driven by a chain 64 and sprocket 61, the latter being fixed to cam shaft 26.

Figure 6:
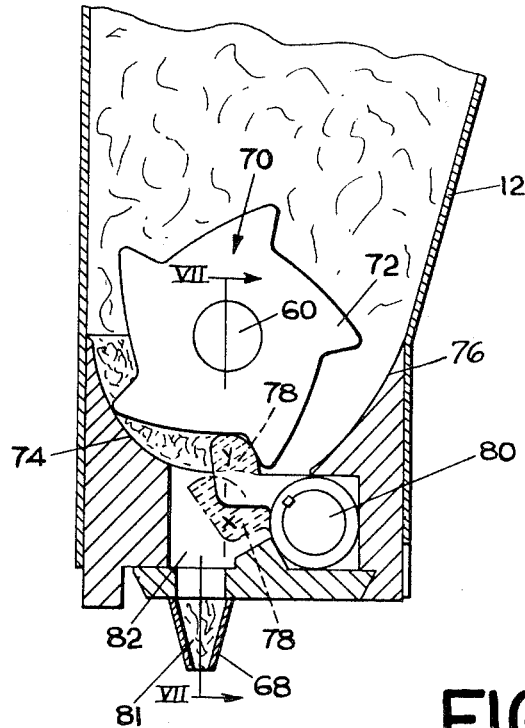
FIG. 6 is a side elevational view in section, of the dough depositing portion of the machine.
Figure 7:
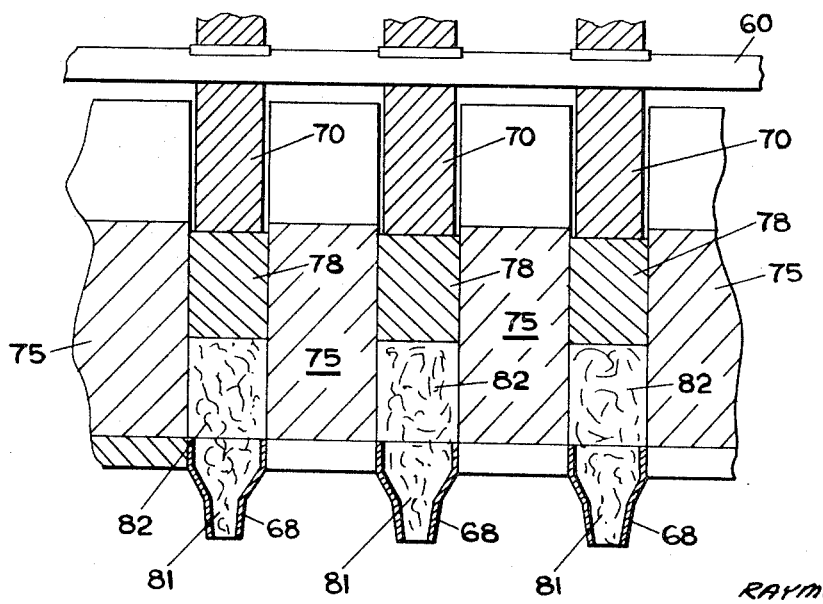
FIG. 7 is a sectional view taken along lines VII–VII of FIG. 6.

Reference is now made to FIGS. 6 and 7. At the bottom of the hopper 12, there is formed a plurality of dough delivering chambers 82 by cavity forming plates 74 and 76, and spacer plates 75. The dough delivering chambers 82 communicate with effluent ports 81 formed by depositing cups 68. The drive shaft 60 drives a plurality of cam wheels 70 which contain teeth or cam lobes 72. One side of the cam lobe 72 is gently sloping and the other side has a more radial angle forming a plurality of dough pockets with the cavity forming plates 74 and 76 and the spacer plates 75.

A cam follower finger is fixed to shaft 80 and bears against the outer surface of the cam wheel 70 to push dough from the dough pockets into a dough delivery chamber 82 and out depositing cups 68.

Referring now again to FIG. 1, the shaft extends out of the side of hopper 12 and it is fixed to arm 83. A spring 84 is fixed at one end to arm 83 and at the other end to a rod 86 which is held by a flange 88. The flange 88 is fixed to the side of the hopper 12. In this manner, the cam finger 78 is biased against the cam wheel 70.

The extent to which the cam follower finger 78 can extend into the dough pockets is limited by an adjustable rod 90 which contacts the top of arm 83 and is fixed to a flange 92 which is in turn fixed on the side of hopper 12.

The operation of the machine will now be described. The intermittent moving of the belt can best be illustrated with reference to FIGS. 4 and 5. The drive roller 38 is driven at a constant speed. The belt 14 is rather loosely wound around the rollers and the bar 36. As the eccentric cams 48 push the slide bars 44 to the rear of the machine (to the left as viewed in FIGS. 4 and 5) the roller will turn the belt and cause movement of the belt in the direction illustrated by the arrow in FIG. 4. Further, the movement of the slide bars 44 and the idler rollers 32 and 34 towards the rear of the machine as indicated by the arrow in FIG. 4, the belt will move additionally due to the pulling of the belt over bar 36 by roller 34.

In other words, the movement of the belt during this portion of the cycle is due to both the movement of the drive roller 38 and the movement of the idler roller 34.

Figure 4:
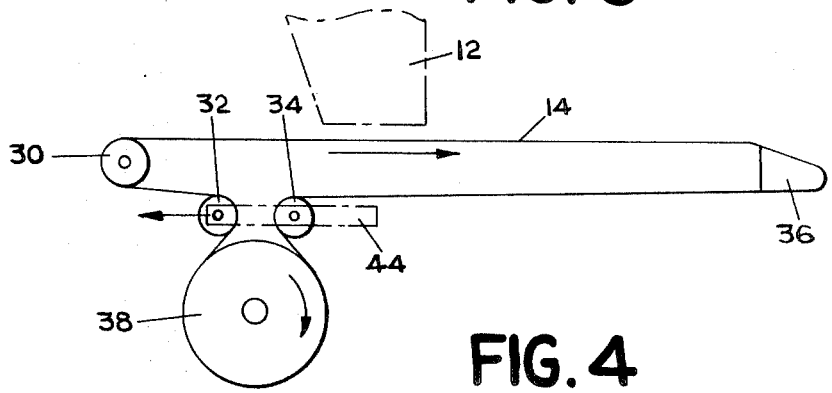
FIGS. 4 and 5 are schematic illustrations of the operation of the intermittently moving conveyor belt.
Figure 5:
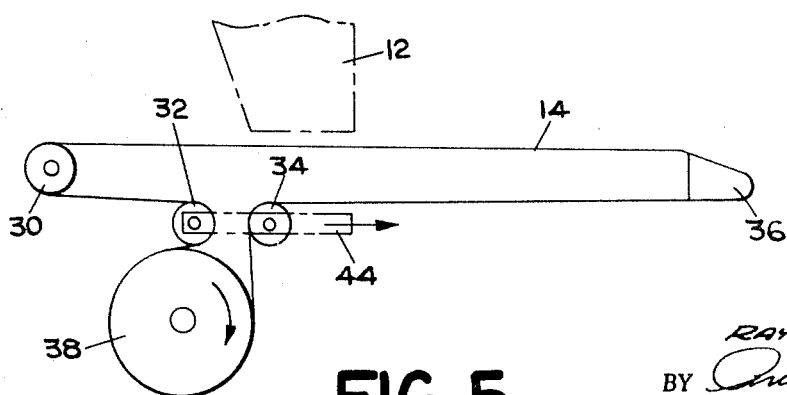

To illustrate this movement in still another way, if the idler rollers 32 and 34 were fixed, then the belt would move continuously in the direction of the arrow of FIG. 4 due to the pulling of the belt by the drive roller 38. On the other hand, if the roller 38 was a fixed roller, and the slide bars 44, containing the idler rollers 32 and 34 were moved to the rear of the machine (to left in FIG. 4) then the movement of the idler roller 34 would pull the belt around bar 36 and cause the top layer of the belt 14 to move in the direction shown by the arrow.

After the slide bars 44 have been moved to the left, they are released. Meanwhile the drive roller 38 continues to turn. As it turns, the roller 38 moves the slide bars 44 and the idler rollers 32 and 34 towards the forward end of the machine (to the right in FIG. 5) as indicated by the arrow in FIG. 5. When the slide bars 44 move to the forward end of the machine, the top layer of the belt 14 will remain stationary. The only portion of the belt which will move is that portion in contact with the roller 38. In other words, a roller 32 takes up the slack generated by drive roller 38 during this portion of the cycle.

Thus, the belt moves intermittently while the drive roller 38 is turned continuously. The period of time during which the belt moves can be shorter or longer than the time in which the belt is stationary. The relative times of belt movement and stopping is controlled by the shape of the cams 48. The speed of the cycle is controlled by the speed of the cam shaft 26.

Each time the cam shaft turns, the cam 50 will raise and lower arms 56 and crossarm 58 to thereby raise and lower the top layer of belt 14 beneath the depositing cups. The raising and lowering of the belt is timed to correspond with the depositing of dough on the belt. Thus, when the depositing cycle is terminated, the belt is lowered away from the depositing cups 68 to aid in severing the dough or other material which has been deposited from that which is still in the depositing cup 68.

The dough is pushed out of the depositing cups 68 by the cam follower finger 78 which in turn is driven by the outer surface of the cam wheel 70. The shape of the cam follower finger 78 is such that a suction will be created in the depositing cup 68 following the depositing portion of the cycle. This suction in the depositing cups is desirable to sever the deposited material from the undeposited material.

The suction created by the shape of the cam follower finger 78 can be illustrated with reference to FIG. 6. At the end of the dough depositing cycle, the cam finger 78 will be in the position illustrated by the phantom lines in FIG. 6. Shortly thereafter, the rotation of the cam wheel 70 will permit the cam follower finger 78 to move into the position shown in solid lines in FIG. 6. During this movement, no dough will be pushed through the depositing cups 68. As the cam follower finger moves into the pocket in the cam wheel 70, it will displace dough within the pocket. The amount of dough displaced is represented by the area Y illustrated by shaded dotted lines in the full line cam follower finger 78. The amount of space available for this displaced dough is represented by the area X shown in dotted shaded lines in the phantom line cam follower finger 78. If the difference between area X and area Y is greater than zero then there will be a void created within the dough deliver chamber 82. The cam follower finger is so shaped so as to make the difference between X and Y positive so as to create a suction within the delivery chamber 82. This suction draws the dough upwardly from the depositing cups 68 to sever the dough in the depositing cups from that which has been already deposited on the belt 14.

The amount of dough deposited on the belt 14 can be adjusted by changing the extent to which the cam follower finger 78 enters the pocket within the cam wheel 70. This extent is controlled by adjustable rod 90 which provides a stop for arm 83 as it moves upwardly. As has been disclosed hereinbefore, the arm 83 is fixed to shaft 80 in which shaft the cam follower finger 78 is keyed.

The movement of the belt is synchronized by the cam shaft and cam arrangement so as to correspond with the upward movement of cam follower finger 78 into the pockets of the cam wheel 70. Further, the upward movement of the cam follower finger 78 is synchronized with the downward movement of the arms 56 so that the belt 14 is drawn away from the depositing cups 68 at the same time that the upward suction is present within the depositing cups. This action provides a positive severing of the dough in the depositing cups from that dough which has been deposited on the belt.

With the use of the machine, very soft dough such as cookie dough, or other fluid material such as jams, can be deposited on the belt. When jams are deposited, the depositing machine can work in conjunction with other dough depositors so that the jam is deposited in cookies which have been formed in another machine.

Whereas the invention has been described with reference to a particular dough depositing machine and a mechanism for intermittently moving the belt beneath the depositing machine, it is within the scope of the invention to employ the intermittently moving belt with other forms of dough depositing machines.

Whereas the invention has been described with the depositing of dough onto a belt, it is within the scope of the invention to deposite the dough, jams and the like onto cookie sheets supported by a belt wherein the sheets are removed from the belts and placed into an oven to bake the cookies.

The belt drive of the invention can be easily converted to a continuous operation from the described intermittent operation by simply fixing the slide bars 44 containing the rollers 32 and 34. The belt will then be driven in a normal manner. In this event, the cams 48 will have to be disengaged so that they do not rotate or so they do not contact slide bars 44.

Reasonable variation and modification are possible within the scope of the foregoing disclosure and drawings without departing from the spirit of the invention.

The embodiments of the invention in which an exclusive property or privilege is claimed are defined as follows:

1. In an apparatus for depositing cookies and the like onto a continuous belt, means for depositing the dough onto said belt, and means for intermittently moving said belt, the improvement in said intermittent belt moving means comprising:
   means supporting said belt so as to form a loop, including means retarding the movement of said belt around said loop;
   means continuously driving a portion of said belt;
   reciprocating belt engaging means adjacent said continuous driving means for moving with said continuous driving means during a first time interval to take up belt slack generated by said continuous driving means, and to move in a direction different than said continuous driving means during a second time interval to move said belt around said loop during said second time interval.

2. An apparatus for depositing cookies and the like according to claim 1 wherein said belt forms a vertical loop.

3. An apparatus for depositing cookies and the like according to claim 1 further comprising belt lifting means beneath said dough depositing means to raise said belt during said first time interval and to lower said belt during said second time interval whereby dough deposited on said belt is severed from dough in said dough depositing means.

4. An apparatus for depositing cookies and the like according to claim 1 wherein said reciprocating belt engaging means comprise a pair of idler rollers supported for unitary movement; track means supporting said idler rollers for reciprocatory movements therein; and cam means for actuating the movements of said idler rollers within said track.

5. An apparatus according to claim 4 wherein said continuous driving means comprises a drum around which passes a substantial portion of said belt.

6. An apparatus according to claim 1 wherein said retarding means comprises a stationary bar around which passes at least a portion of said belt.

7. An apparatus according to claim 1 wherein said continuous driving means comprises a drum around which passes a substantial portion of said belt.